United States Patent
Kashiwagi

(10) Patent No.: US 10,797,463 B2
(45) Date of Patent: Oct. 6, 2020

(54) FIBER LASER SYSTEM AND METHOD FOR CONTROLLING SAME

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/481,581

(22) PCT Filed: Jan. 10, 2018

(86) PCT No.: PCT/JP2018/000342
§ 371 (c)(1),
(2) Date: Jul. 29, 2019

(87) PCT Pub. No.: WO2018/142857
PCT Pub. Date: Aug. 9, 2018

(65) Prior Publication Data
US 2020/0006910 A1    Jan. 2, 2020

(30) Foreign Application Priority Data

Jan. 31, 2017    (JP) .................................. 2017-016288

(51) Int. Cl.
*H01S 3/067*    (2006.01)
*H01S 3/102*    (2006.01)

(52) U.S. Cl.
CPC .............. *H01S 3/067* (2013.01); *H01S 3/102* (2013.01)

(58) Field of Classification Search
CPC .. H01S 3/091; H01S 3/0912; H01S 3/094003; H01S 3/094046; H01S 3/067; H01S 3/102
See application file for complete search history.

(56) References Cited

U.S. PATENT DOCUMENTS 6,038,061 A * 3/2000 Sugaya ............. H01S 3/094003
359/337
2016/0359288 A1    12/2016 Matsuoka

FOREIGN PATENT DOCUMENTS

| CN | 101842946 A | 9/2010 |
| CN | 102388512 A | 3/2012 |
| CN | 103236628 A | 8/2013 |
| JP | 2010-129886 A | 6/2010 |

(Continued)

OTHER PUBLICATIONS

Notification of Transmittal of Translation of the International Preliminary Report on Patentabililty (Form PCT/IB/338) issued in counterpart International Application No. PCT/JP2018/000342 dated Aug. 15, 2019 with Forms PCT/IB/373 and PCT/ISA/237. ( 9 pages).

(Continued)

*Primary Examiner* — Armando Rodriguez
(74) *Attorney, Agent, or Firm* — Westerman, Hattori, Daniels & Adrian, LLP

(57) ABSTRACT

In a case where a variation in reflection resistance among fiber lasers occurs, a reflection resistance of a fiber laser system as a whole is restored by reducing the variation while maintaining an output power of the fiber laser system as a whole. The fiber laser system includes a control section (C) configured to increase a proportion of a backward excitation power (PBi) in a fiber laser (FLi) so that fiber lasers (FL1 through FLn) less vary in reflection resistance.

5 Claims, 4 Drawing Sheets

(56) References Cited

FOREIGN PATENT DOCUMENTS

| JP | 2015-095641 A | 5/2015 |
| JP | 6062018 B1 | 1/2017 |
| WO | 2012/036664 A1 | 3/2012 |
| WO | 2012/085563 A1 | 6/2012 |
| WO | 2014/014068 A1 | 8/2019 |

OTHER PUBLICATIONS

International Search Report dated Feb. 13, 2018, issued in counterpart Application No. PCT/JP2018/000342. (3 pages).
Ikoma, S. et al., "3 kW single stage all-fiber Yb-doped single-mode fiber laser for highly reflective and highly thermal conductive materials processing" Proceedings vol. 10083, Fiber Lasers XIV: Technology and Systems; 100830Y (2017), Jan. 28, 2017; Cited in CN Office Action dated Aug. 5, 2020. (6 pages).

\* cited by examiner

FIBER LASER SYSTEM AND METHOD FOR CONTROLLING SAME

TECHNICAL FIELD

The present invention relates to a fiber laser system including a fiber laser group including at least one bidirectional excitation fiber laser. The present invention also relates to a method for controlling such a fiber laser system.

BACKGROUND ART

In recent years, in the field of material processing, there have been demands for laser devices having an output power of kW. It is difficult, however, to achieve such a laser device with the use of a single fiber laser. Under the circumstances, a fiber laser system which includes a plurality of fiber lasers and a combiner configured to combine waves of laser light outputted by the respective fiber lasers has started to be used in the field of material processing.

With such a fiber laser system, laser light reflected from an object which is being processed (hereinafter referred to as a "processing target object") may re-enter the fiber laser system and cause a malfunction in the fiber laser system.

Such a malfunction is caused in the fiber laser system due to stimulated Raman scattering. Stimulated Raman scattering can be considered a process of power conversion from laser light to Stokes light. It is known that a greater conversion efficiency (Raman gain) of Stimulated Raman scattering causes Stokes oscillation to more easily occur, so that an oscillation state of each fiber laser may be made unstable or a malfunction may occur in each fiber laser (see Patent Literature 1).

CITATION LIST

Patent Literature

Patent Literature 1
Japanese Patent Application Publication, Tokukai, No. 2015-95641 A (Publication Date: May 18, 2015)

SUMMARY OF INVENTION

Technical Problem

The inventors of the present invention found, for each fiber laser constituting a fiber laser system, that a ratio of (a) a Stokes light power included in a forward output power to (b) a laser light power included in a backward output power serves as an index indicating difficulty in occurrence of Stokes oscillation (hereinafter also referred to as "reflection resistance"). Note here that a laser light power included in a backward output power and a Stokes light power included in a forward output power are a laser light power and a Stokes light power, respectively, each of which has been measured while all fiber lasers are caused to be in rated operation. A higher ratio between the laser light power and the Stokes light power (closer to 1) causes Stokes oscillation to more easily occur. This results in a low reflection resistance. In contrast, a lower ratio between the laser light power and the Stokes light power (closer to 0) causes Stokes oscillation to less easily occur. This results in a high reflection resistance.

According to a fiber laser system, fiber lasers may vary in reflection resistance. In a case where fiber lasers vary in reflection resistance, a fiber laser system as a whole deteriorates in reflection resistance by being strongly affected by a fiber laser which has a low reflection resistance. This is because, in a case where Stokes oscillation occurs in a fiber laser which has a low reflection resistance, Stokes light which has been generated by that fiber laser causes Stokes oscillation to occur also in a fiber laser which has a high reflection resistance. Thus, it is desired that, in a case where fiber lasers vary in reflection resistance, a reflection resistance of a fiber laser system as a whole be restored by increasing a reflection resistance of a fiber laser which has a low reflection resistance.

Note, however, that it has not been known how to change a reflection resistance of a fiber laser without the need to increase or decrease a laser light power included in a backward output power of the fiber laser. Thus, in a case where fiber lasers vary in reflection resistance, it has been difficult to restore a reflection resistance of a fiber laser system as a whole while maintaining an output power of the fiber laser system as a whole.

Note that fiber lasers vary in reflection resistance in, for example, a case where a malfunction occurs in a laser diode which is provided in a fiber laser so as to serve as an excitation light source. For example, a fiber laser system including three fiber lasers is to be discussed. It is assumed that each of the fiber lasers includes six laser diodes. According to the fiber laser system, in a case where any one of the laser diodes malfunctions in any one of the fiber lasers, a sum of excitation light powers obtained in the fiber lasers comes to 17/18 times an output obtained in a case where none of the laser diodes malfunction in the fiber lasers, and the fiber laser system has a lower output power accordingly. In this case, by supplying, to the fiber lasers, a driving electric current 18/17 times larger than that supplied to the fiber lasers in which none of the laser diodes malfunction, the fiber laser system carries out control so as to maintain its output power. Then, a power of excitation light of a fiber laser including a laser diode in which a malfunction occurs comes to $5/6 \times 18/17 (<1)$ times the power which had been obtained before the malfunction occurred, whereas a power of excitation light of a fiber laser including no laser diode in which a malfunction occurs comes to $6/6 \times 18/17 (>1)$ times the power which had been obtained before the malfunction occurred. In this case, a fiber laser having a great excitation light power, i.e., a fiber laser including no laser diode in which a malfunction occurs has a lower reflection resistance.

The present invention has been made in view of the problems, and an object of the present invention is to achieve a fiber laser system which is capable of, in a case where fiber lasers vary in reflection resistance, restoring a reflection resistance of the fiber laser system as a whole while maintaining an output power of the fiber laser system as a whole.

Solution to Problem

The inventors of the present invention found that a smaller amount of Stokes light is generated by stimulated Raman scattering in a case where asymmetric excitation (causing a power of backward excitation light to be greater than a power of forward excitation light) is carried out with respect to a bidirectional excitation fiber laser than in a case where symmetric excitation (causing a power of backward excitation light to be equal to a power of forward excitation light) is carried out with respect to the bidirectional excitation fiber laser. FIG. 5 is a graph showing wavelength dependency of a relative power of light which is outputted by a bidirectional excitation fiber laser (a power measured at a lasing wavelength λL of laser light is assumed to be 1). A comparison between relative powers measured at a wavelength λS of Stokes light shows that a relative power obtained in a case where asymmetric excitation is carried out is smaller by approximately 5 dB than a relative power obtained in a case where symmetric excitation is carried out.

This means that a change in ratio between a power of forward excitation light and a power of backward excitation light makes it possible to change a reflection resistance without the need to increase or decrease a laser light power included in a backward output power. This specifically means that, without the need to increase or decrease a laser light power included in a backward output power, it is possible to achieve a higher reflection resistance by increasing a proportion of a power of backward excitation light while maintaining a sum of a power of forward excitation light and the power of the backward excitation light. The present invention was obtained based on the above knowledge.

In order to attain the object, a fiber laser system in accordance with an aspect of the present invention includes: a fiber laser group including at least one bidirectional excitation fiber laser; and a control section configured to increase a proportion of a backward excitation light power in the at least one bidirectional excitation fiber laser so that fiber lasers constituting the fiber laser group less vary in reflection resistance.

A control method in accordance with an aspect of the present invention is a method for controlling a fiber laser system including a fiber laser group including at least one bidirectional excitation fiber laser, the method including the step of: increasing a proportion of a backward excitation light power in the at least one bidirectional excitation fiber laser so that fiber lasers constituting the fiber laser group less vary in reflection resistance.

Advantageous Effects of Invention

An aspect of the present invention makes it possible to achieve a fiber laser system which is capable of, in a case where fiber lasers vary in reflection resistance, restoring a reflection resistance of the fiber laser system as a whole while maintaining an output power of the fiber laser system as a whole.

DESCRIPTION OF EMBODIMENTS (Configuration of Fiber Laser System)

Figure 1:
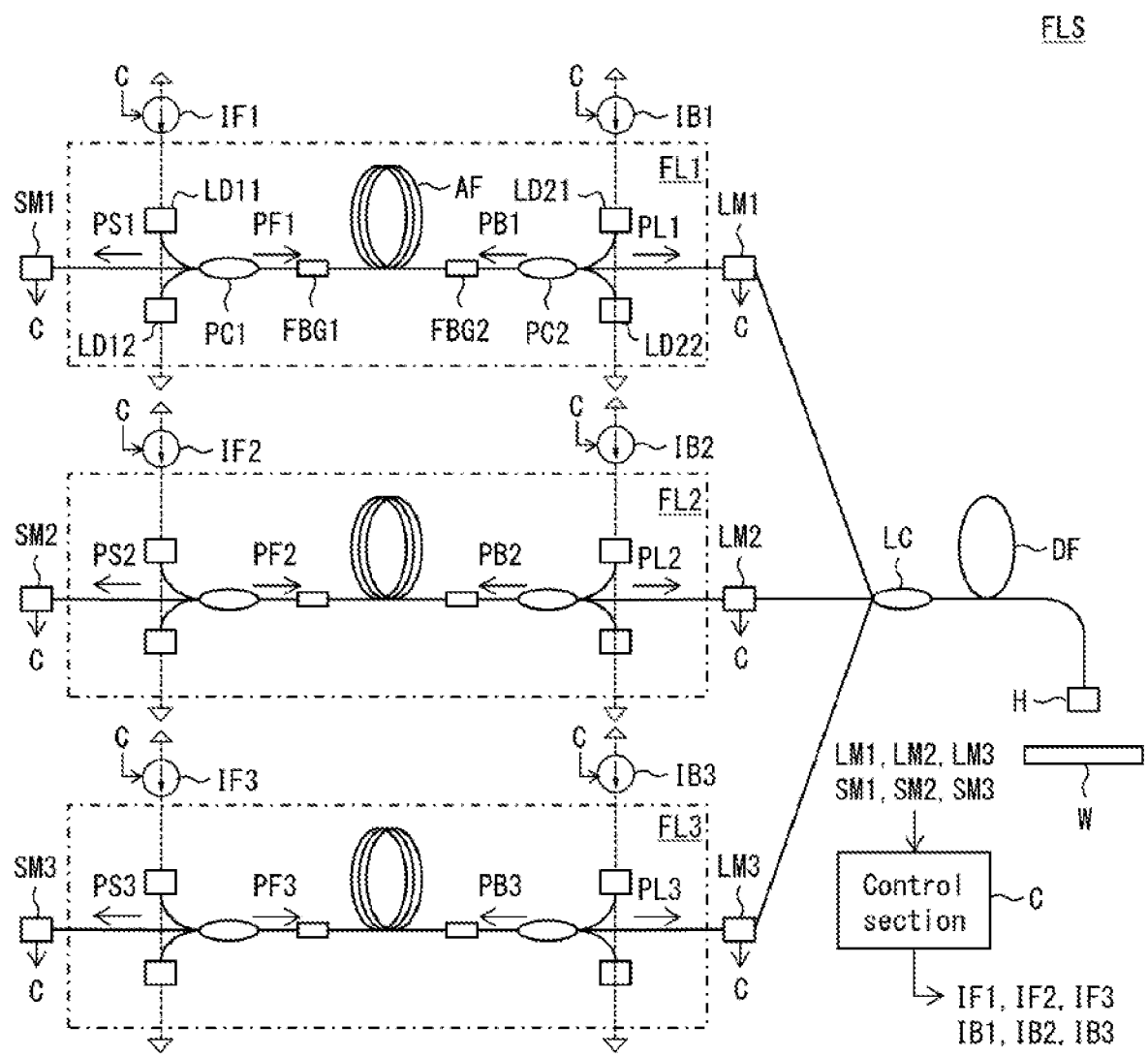
FIG. 1 is a block diagram illustrating a configuration of a fiber laser system.

The following description will discuss, with reference to FIG. 1, a configuration of a fiber laser system FLS in accordance with an embodiment of the present invention. FIG. 1 is a block diagram illustrating a configuration of the fiber laser system FLS.

The fiber laser system FLS is a processing laser device. As illustrated in FIG. 1, the fiber laser system FLS includes (i) n fiber lasers FL1 through FLn (n is an integer), (ii) a laser combiner LC, (iii) a delivery fiber DF, (iv) a processing head H, and (v) a control section C. Each fiber laser FLi (i=1, 2, . . . , n) is a bidirectional excitation fiber laser. FIG. 1 illustrates a configuration in which n=3. Note, however, that any number of fiber lasers FL1 through FLn can be provided.

The fiber laser FLi, which is a bidirectional excitation fiber laser, serve as a laser source configured to generate laser light. The fiber laser FLi is connected to a corresponding one of input ports of the laser combiner LC. Laser light generated by the fiber laser FLi is supplied to the laser combiner LC via a corresponding input port.

The laser combiner LC combines together waves of laser light generated by the respective fiber lasers FL1 through FLn, so that combined laser light is obtained. The laser combiner LC has an output port which is connected to an input end of the delivery fiber DF. The combined laser light thus obtained in the laser combiner LC is supplied to the delivery fiber DF.

The delivery fiber DF guides the combined laser light thus obtained in the laser combiner LC. The delivery fiber DF has an exit end which is connected to the processing head H. Light which has been guided through the delivery fiber DF is emitted through the processing head H to a processing target object W.

The fiber laser system FLS further includes laser power monitors LM1 through LMn, Stokes power monitors SM1 through SMn, and the control section C.

Laser power monitors LMi each measure a laser light power PLi included in a backward output power of a corresponding fiber laser FLi. A laser power monitor LMi can be configured to include, for example, (i) a filter configured to selectively let through light in a band including a lasing wavelength of a fiber laser FLi (a band including no Stokes wavelength (described later)) and (ii) a power measuring device configured to measure a power of light which has been let through the filter. Alternatively, the laser power monitor LMi can be a power measuring device (Rayleigh monitor) configured to measure a power of Rayleigh scattering light which is generated by an optical fiber which guides a backward output power of a corresponding fiber laser FLi. The laser power monitor LMi can alternatively be a power measuring device (leaking light monitor) configured to measure a power of light having leaked from a fusion splice point at which an optical fiber which guides a backward output power of a corresponding fiber laser FLi are fusion-spliced. A measurement result obtained in the laser power monitor LMi is supplied to the control section C.

Stokes power monitors SMi each measure a Stokes light power PSi included in a forward output power of a corresponding fiber laser FLi. A Stokes power monitor SMi can be configured to include, for example, (i) a filter configured to selectively let through light in a band including a Stokes wavelength of a fiber laser FLi (a band including no lasing wavelength (described earlier)) and (ii) a power measuring device configured to measure a power of light which has been let through the filter. Note here that a Stokes wavelength of a fiber laser FLi refers to a wavelength obtained by adding, to a lasing wavelength of that fiber laser FLi, a wavelength corresponding to a Raman shift. A measurement result obtained in the Stokes power monitor SMi is supplied to the control section C.

In accordance with the measurement result obtained in the laser power monitor LMi and the measurement result obtained in the Stokes power monitor SMi, the control section C controls a power ratio between a power of forward excitation light PFi (hereinafter referred to as "a forward excitation light power PFi") and a power of backward excitation light PBi (hereinafter referred to as "a backward excitation light power PBi") in each fiber laser FLi so that the fiber lasers FL1 through FLn less vary in reflection resistance. This prevents a situation in which the fiber laser system FLS as a whole deteriorates in reflection resistance by being strongly affected by a fiber laser FLi which has a low reflection resistance. Note that a specific example of power ratio control will be described later with reference to other drawing(s) with which FIG. 1 is replaced.

Note that the control section C controls the forward excitation light power PFi of a fiber laser FLi by, for example, controlling an electric current source IFi so as to increase or decrease a driving electric current to be supplied to a forward excitation light source (forward laser diodes LD11 through LD1m described later) of the fiber laser FLi. Similarly, the control section C controls the backward excitation light power PBi of the fiber laser FLi by, for example, controlling an electric current source IBi so as to increase or decrease a driving electric current to be supplied to a backward excitation light source (backward laser diodes LD21 through LD2m described later) of the fiber laser FLi.

Embodiment 1 employs a configuration in which all the fiber lasers FL1 through FLn constituting the fiber laser system FLS are bidirectional excitation fiber lasers. Note, however, that an aspect of the present invention can employ any configuration that is not limited to the above configuration. That is, the fiber laser system FLS can include at least one bidirectional excitation fiber laser, and the other fiber lasers of the fiber laser system FLS can each be either a forward excitation fiber laser or a backward excitation fiber laser.

(Configuration of Fiber Laser)

The following description will discuss, by continuously referring to FIG. 1, a configuration of the fiber laser FL included in the fiber laser system FLS. Note that respective configurations of the fiber lasers FL2 through FLn are similar to the configuration of the fiber laser FL1 described below.

The fiber laser FL1 is a bidirectional excitation fiber laser. As illustrated in FIG. 1, the fiber laser FL1 includes m forward laser diodes LD11 through LD1m (m is an integer), a forward excitation combiner PC1, a high-reflective fiber Bragg grating FBG1, an amplifying optical fiber AF, a low-reflective fiber Bragg grating FBG2, a backward excitation combiner PC2, m backward laser diodes LD21 through LD2m (m is an integer), and the backward excitation combiner PC2. FIG. 1 illustrates a configuration in which m=2. Note, however, that any number of forward laser diodes LD11 through LD1m and any number of backward laser diodes LD21 through LD2m can be provided (the forward laser diodes LD11 through LD1m and the backward laser diodes LD21 through LD2m can differ in number).

A forward laser diode LD1j (j=1, 2, . . . , m) serves as an excitation light source configured to generate forward excitation light. The forward laser diode LD1j is connected to a corresponding one of peripheral input ports (input ports different from a central input port) of the forward excitation combiner PC1. Forward excitation light generated by the forward laser diode LD1j is supplied to the forward excitation combiner PC1 via a corresponding peripheral input port.

The forward excitation combiner PC1 combines together waves of forward excitation light generated by the respective forward laser diodes LD11 through LD1m, so that combined forward excitation light is obtained. The forward excitation combiner PC1 has an output port which is connected to the amplifying optical fiber AF via the high-reflective fiber Bragg grating FBG1. The combined forward excitation light obtained in the forward excitation combiner PC1 passes through the high-reflective fiber Bragg grating FBG1 and is supplied to the amplifying optical fiber AF. Note that the central input port of the forward excitation combiner PC1 is connected to the Stokes power monitor SM1 which is configured to measure a Stokes light power PS1 included in a forward output power of the fiber laser FL1.

The amplifying optical fiber AF is an optical fiber having a core to which a rare earth element is added. The amplifying optical fiber AF has (i) one end which is connected to the high-reflective fiber Bragg grating FBG1 which functions as a high-reflective mirror and (ii) the other end which is connected to the low-reflective fiber Bragg grating FBG2 which functions as a low-reflective mirror. The amplifying optical fiber AF, the high-reflective fiber Bragg grating FBG1, and the low-reflective fiber Bragg grating FBG2 constitute a laser oscillator configured to oscillate laser light. Forward excitation light (described earlier) and backward excitation light (described later) are used to change a state of the rare earth element added to the core to a population inversion state. The amplifying optical fiber AF has an exit end which is connected to an output port of the backward excitation combiner via the low-reflective fiber Bragg grating FBG2. Of waves of laser light generated in the amplifying optical fiber AF, laser light which has passed through the low-reflective fiber Bragg grating FBG2 is supplied to the backward excitation combiner PC2 via the output port.

A backward laser diode LD2j (j=1, 2, . . . , m) serves as an excitation light source configured to generate backward excitation light. The backward laser diode LD2j is connected to a corresponding one of peripheral input ports (input ports different from a central input port) of the backward excitation combiner PC2. Backward excitation light generated by the backward laser diode LD2j is supplied to the backward excitation combiner PC2 via a corresponding peripheral input port.

The backward excitation combiner PC2 combines together waves of backward excitation light generated by the respective backward laser diodes LD21 through LD2m, so that combined backward excitation light is obtained. As described earlier, the output port of the backward excitation combiner PC2 is connected to the amplifying optical fiber AF via the low-reflective fiber Bragg grating FBG2. The combined backward excitation light obtained in the backward excitation combiner PC2 passes through the low-reflective fiber Bragg grating FBG2 and is supplied to the amplifying optical fiber AF. Note that the central input port of the backward excitation combiner PC2 is connected to the laser power monitor LM1 which is configured to measure a laser light power PL1 included in a backward output power of the fiber laser FL1.

(Power Ratio Control)

Figure 2:
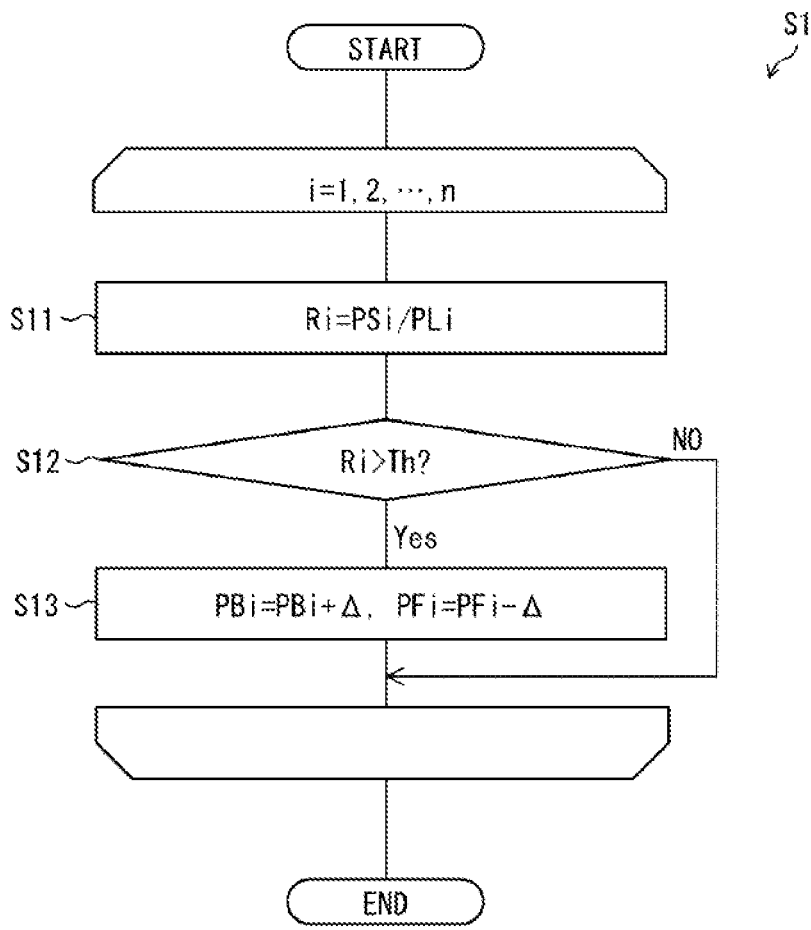
FIG. 2 is a flowchart showing a flow of a first power ratio control method carried out in the fiber laser system illustrated in FIG. 1.

The following description will discuss, with reference to FIGS. 2 through 4, a method in which the control section C controls a ratio between the forward excitation light power PFi and the backward excitation light power PBi of each fiber laser FLi (hereinafter referred to as "a power ratio control method"). Note that the power ratio control method described below is periodically carried out in, for example, a state in which no processing target object W is present.

In the following description, a laser light power PLi included in a backward output power of a fiber laser FLi is referred to as "a laser power PLi", a Stokes light power PSi included in a forward output power of the fiber laser FLi is referred to as "a Stokes power PSi", the forward excitation light power PFi of the fiber laser FLi is referred to as "a forward excitation power PFi", and the backward excitation light power PBi of the fiber laser FLi is referred to as "a backward excitation power PBi".

Note that the control section C uses a reflection resistance index Ri of the fiber laser FLi to carry out the power ratio control method. Note here that the reflection resistance index Ri of the fiber laser FLi is an index indicating a reflection resistance of the fiber laser FLi. The reflection resistance index Ri is given by, for example, the following equation: Ri=PSi/PLi. In this case, a lower reflection resistance index Ri can be said to make it more difficult for Stokes oscillation to occur (i.e., make a reflection resistance higher). In contrast, a higher reflection resistance index Ri can be said to make it easier for Stokes oscillation to occur (i.e., make a reflection resistance lower).

The control section C controls a power ratio between the forward excitation power PFi and the backward excitation power PBi of each fiber laser FLi so that the fiber lasers FL1 through FLn less vary in reflection resistance. The power ratio control method for reducing a variation in reflection resistance index Ri is exemplified by various methods. Of such various methods, two power ratio control methods are described here.

A first power ratio control method S1 is a method for changing a power ratio between the forward excitation power PFi and the backward excitation power PBi in order for a fiber laser FLi whose reflection resistance index Ri has exceeded a predetermined threshold Th to have a reflection resistance index Ri which is not more than the threshold Th. FIG. 2 is a flowchart showing a flow of the first power ratio control method S1.

The control section C carries out the following steps S11 through S13 with respect to each of the fiber lasers FL1 through FLn.

Step S1.1: The control section C calculates the reflection resistance index Ri of a fiber laser FLi in accordance with the laser power PLi and the Stokes power PSi of the fiber laser FLi.

Step S12: The control section C determines whether the reflection resistance index Ri which has been calculated in the step S11 is higher than the predetermined threshold Th. In a case where the reflection resistance index Ri is higher than the threshold Th, the control section C carries out the following step S13.

Step S13: The control section C increases a proportion of the backward excitation power PBi to a sum of the forward excitation power PFi and the backward excitation power PBi. That is, in order for the backward excitation power PBi to increase by $\Delta$, the control section C causes a larger amount of driving electric current to be supplied to each of the backward laser diodes LD21 through LD2$m$. In addition, in order for the forward excitation power PFi to decrease by $\Delta$, the control section C causes a smaller amount of driving electric current to be supplied to each of the forward laser diodes LD11 through LD1$m$. In this case, the control section C determines an increment $\Delta$ in backward excitation power PBi and a decrement $\Delta$ in forward excitation power PFi so that the reflection resistance index Ri is not more than the threshold Th. Note that a total of respective powers of waves of excitation light (PFi+PBi) is kept constant because the increment $\Delta$ in backward excitation power PBi and the decrement $\Delta$ in forward excitation power PFi are equal to each other.

Figure 3:
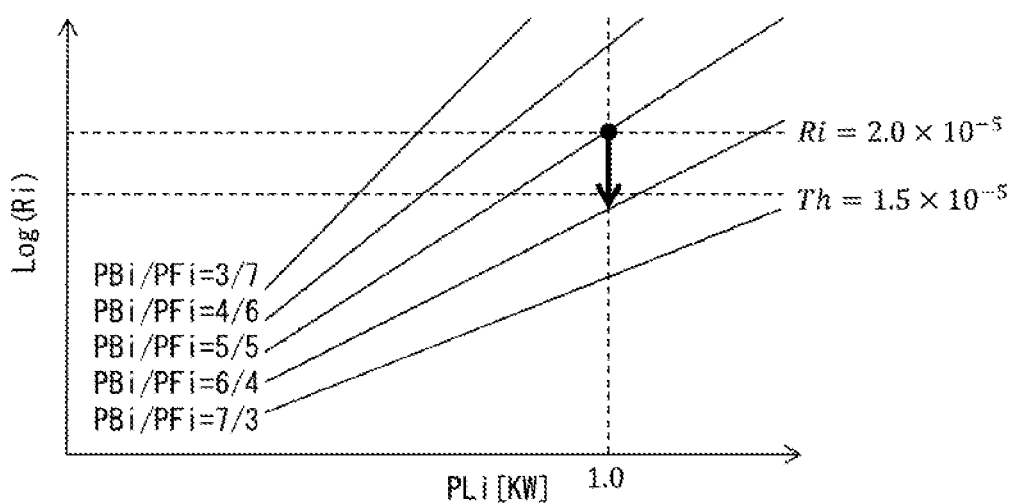
FIG. 3 is a graph showing a relationship between a laser power and a reflection resistance index in a case where excitation powers are in ratios of 3/7, 4/6, 5/5, 6/4, and 7/3.
Figure 4:
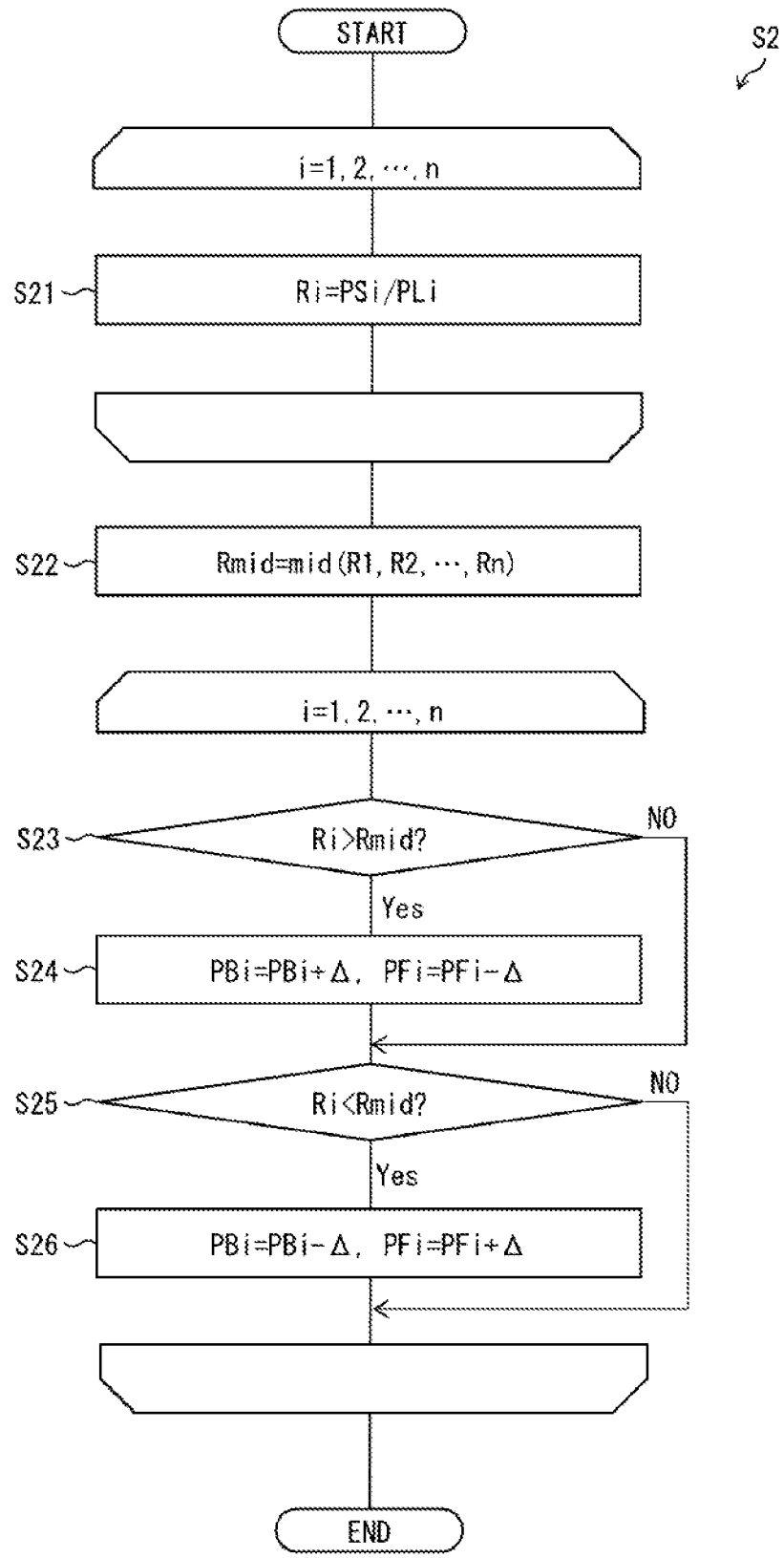
FIG. 4 is a flowchart showing a flow of a second power ratio control method carried out in the fiber laser system illustrated in FIG. 1.
Figure 5:
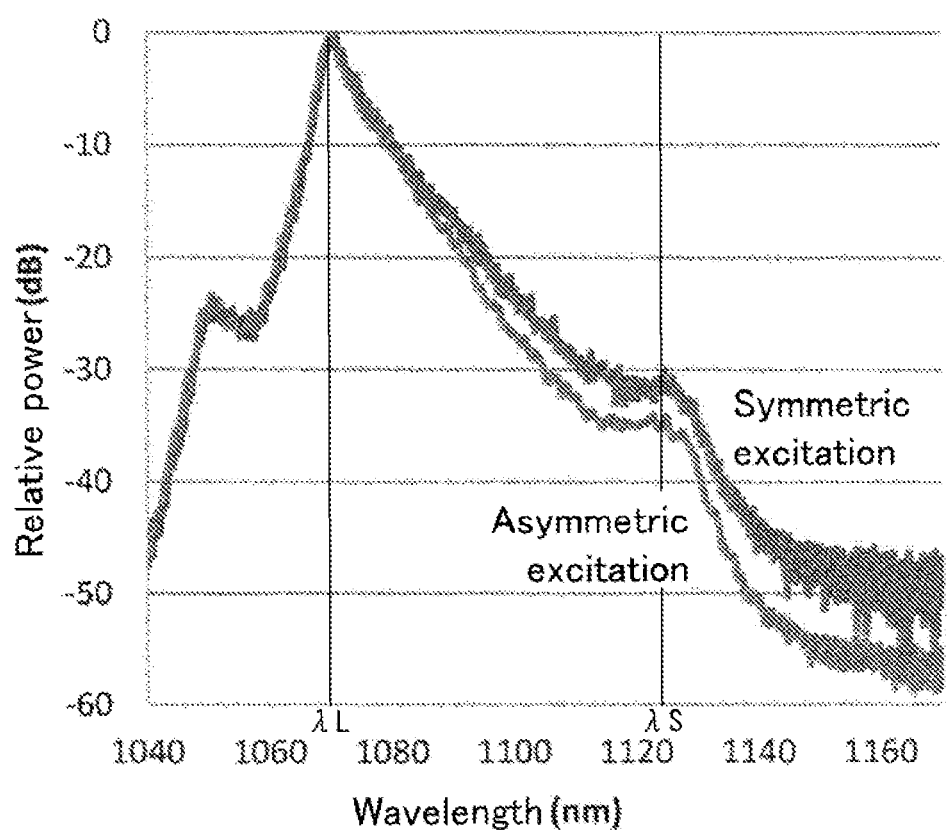
FIG. 5 is a graph showing wavelength dependency of a relative power of light which is outputted by a bidirectional excitation fiber laser (a power measured at a lasing wavelength λL of laser light is assumed to be 1).

The following will give, with reference to FIG. 3, a supplementary explanation of a process for determining the increment $\Delta$ in backward excitation power PBi (=the decrement $\Delta$ in forward excitation power PFi) in the step S13 of the first power ratio control method S1. FIG. 3 is a graph showing a relationship between the laser power PLi and the reflection resistance index Ri. FIG. 3 shows a relationship between the laser power PLi and the reflection resistance index Ri in a case where excitation powers are in ratios (PBi/PFi) of 3/7, 4/6, 5/5, 6/4, and 7/3.

Assume, for example, that PBi/PFi=5/5, PLi=1.0 KW, and Ri=$2.0 \times 10^{\wedge}(-5)$ before the step S13 is carried out. In a case where the threshold Th=$1.5 \times 10^{\wedge}(-5)$, Ri>Th. Thus, the step S13 is carried out. In this case, a change in ratio (PBi/PFi) between the excitation powers from 5/5 to 6/4 allows the reflection resistance index Ri to be not more than the threshold Th. Thus, in a case where the increment $\Delta$ is set so that PBi/PFi=6/4, the reflection resistance index Ri can be not more than the threshold Th.

In a case where a table in which a discretized value of PBi/PFi and a discretized value of Ri are associated with each other is prepared for each discretized value of PLi, the increment $\Delta$ in backward excitation power PBi can be determined by causing the control section C to carry out the following processes.

Process 1: The control section C selects a table which corresponds to a discretized value of PLi which discretized value is the closest to a measured value of PLi.

Process 2: The control section C selects, in the table selected in the process 1, a value of Ri which value is the largest of all values that are not more than the threshold Th.

Process 3: The control section C selects, in the table selected in the process 1, a value of PBi/PFi which value corresponds to the value of Ri which value has been selected in the process 2.

Process 4: The control section C calculates the increment $\Delta$ by solving the following equation: (measured value of PBi+$\Delta$)/(measured value of PFi−$\Delta$)=(value of PBi/PFi selected in process 3).

By carrying out the first power ratio control method S1, it is possible for a fiber laser FLi whose reflection resistance index Ri has exceeded the threshold Th to have a reflection resistance index Ri which is reduced so as to be not more than the threshold Th. This makes it possible to achieve a smaller variation among respective reflection resistance indices R1 through Rn of the fiber lasers FL1 through FLn without the need to increase the reflection resistance index Ri of any fiber laser FLi. In other words, it is possible to achieve a smaller variation in reflection resistance among the fiber lasers FL1 through FLn without a deterioration in reflection resistance of any fiber laser FLi.

A second power ratio control method S2 is a method for changing a power ratio between the forward excitation power PFi and the backward excitation power PBi in order for a fiber laser FLi whose reflection resistance index Ri is different from a median Rmid of the reflection resistance indices R1 through Rn to have a reflection resistance index Ri which is closer to the median Rmid. FIG. 4 is a flowchart showing a flow of the second power ratio control method S2.

The control section C carries out the following step S21 with respect to each of the fiber lasers FL1 through FLn.

Step S21: The control section C calculates the reflection resistance index Ri of a fiber laser FLi in accordance with the forward excitation power PFi and the backward excitation power PBi of the fiber laser FLi.

Next, the control section C carries out the following step S22.

Step S22: The control section C calculates the median Rmid of the reflection resistance indices R1 through Rn which have been calculated in the step S21.

Subsequently, the control section C carries out the following steps S23 through S26 with respect to each of the fiber lasers FL1 through FLn.

Step S23: The control section C determines whether the reflection resistance index Ri which has been calculated in the step S21 is higher than the median Rmid which has been calculated in the step S22. In a case where the reflection resistance index Ri is higher than the median Rmid, the control section C carries out the following step S24.

Step S24: The control section C increases a proportion of the backward excitation power PBi to a sum of the forward excitation power PFi and the backward excitation power PBi. That is, in order for the backward excitation power PBi to increase by $\Delta$, the control section C causes a larger amount of driving electric current to be supplied to each of the backward laser diodes LD21 through LD2$m$. In addition, in order for the forward excitation power PFi to decrease by $\Delta$, the control section C causes a smaller amount of driving electric current to be supplied to each of the forward laser diodes LD11 through LD1$m$. In this case, the control section C determines an increment $\Delta$ in backward excitation power PBi and a decrement $\Delta$ in forward excitation power PFi so that the reflection resistance index Ri which is obtained after the step S24 is carried out is closer, as much as possible, to the median Rmid which has been calculated in the step S22. A process for determining the increment $\Delta$ in backward excitation power PBi and the decrement $\Delta$ in forward excitation power PFi in the step S24 is similar to the process for determining the increment $\Delta$ in backward excitation power PBi and the decrement $\Delta$ in forward excitation power PFi in the step S13 of the first power ratio control method S1. Note that a total of respective powers of waves of excitation light (PFi+PBi) is kept constant because the increment $\Delta$ in backward excitation power PBi and the decrement $\Delta$ in forward excitation power PFi are equal to each other.

Step S25: The control section C determines whether the reflection resistance index Ri which has been calculated in the step S21 is lower than the median Rmid which has been calculated in the step S22. In a case where the reflection resistance index Ri is lower than the median Rmid, the control section C carries out the following step S26.

Step S26: The control section C reduces a proportion of the backward excitation power PBi to a sum of the forward excitation power PFi and the backward excitation power PBi. That is, in order for the backward excitation power PBi to decrease by $\Delta$, the control section C causes a smaller amount of driving electric current to be supplied to each of the backward laser diodes LD21 through LD2$m$. In addition, in order for the forward excitation power PFi to increase by $\Delta$, the control section C causes a larger amount of driving electric current to be supplied to each of the forward laser diodes LD11 through LD1$m$. In this case, the control section C determines a decrement $\Delta$ in backward excitation power PBi and an increment $\Delta$ in forward excitation power PFi so that the reflection resistance index Ri which is obtained after the step S26 is carried out is closer, as much as possible, to the median Rmid which has been calculated in the step S22. A process for determining the decrement $\Delta$ in backward excitation power PBi and the increment $\Delta$ in forward excitation power PFi in the step S26 is similar to the process for determining the increment $\Delta$ in backward excitation power PBi and the decrement $\Delta$ in forward excitation power PFi in the step S13 of the first power ratio control method S1. Note that a total of respective powers of waves of excitation light (PFi+PBi) is kept constant because the decrement $\Delta$ in backward excitation power PBi and the increment $\Delta$ in forward excitation power PFi are equal to each other.

By carrying out the second power ratio control method S2, it is possible for a fiber laser FLi whose reflection resistance index Ri is different from the median Rmid to have a reflection resistance index Ri which is closer to the median Rmid. For example, by carrying out the second power ratio control method S2 in a case where power ratios PB1/PF1, PB2/PF2, and PB3/PF3 are each 1 and the reflection resistance indices R1, R2, and R3 are $1.0 \times 10^{-5}$, $1.5 \times 10^{-5}$ (median), and $2.0 \times 10^{-5}$, respectively, the power ratios PB1/PF1, PB2/PF2, and PB3/PF3 stand at 0.7, 1.0, and 1.5, respectively, and the reflection resistance indices R1, R2, and R3 each stand at $1.5 \times 10^{-5}$. By thus carrying out the second power ratio control method S2, it is possible to reduce a variation among the respective reflection resistance indices R1 through Rn of the fiber lasers FL1 through FLn without unnecessarily widening a difference between the forward excitation power PFi and the backward excitation power PBi in each fiber laser FLi. In other words, it is possible to achieve a smaller variation in reflection resistance among the fiber lasers FL1 through FLn without unnecessarily shortening a life of the forward laser diodes LD11 through LD1$m$ or the backward laser diodes LD21 through LD2$m$ of each fiber laser FLi.

Note that the fiber laser system FLS can include at least one bidirectional excitation fiber laser as described earlier and the other fiber lasers of the fiber laser system FLS can each be either a forward excitation fiber laser or a backward excitation fiber laser. For example, in a case where the fiber laser system FLS includes one bidirectional excitation fiber laser FL1 and two forward excitation fiber lasers FL2 and FL3, it is possible to carry out, for example, such control as described below. (1) A comparison among respective reflection resistances of the three fiber lasers FL1 through FL3 is carried out. (2) In a case where the bidirectional excitation fiber laser FL1 has the lowest reflection resistance as a result of the comparison carried out in (1), a proportion of a power of backward excitation light is increased in the fiber laser FL1. This allows the fiber laser FL1 to have a higher reflection resistance, so that the three fiber lasers FL1 through FL3 less vary in reflection resistance. (3) In a case where the forward excitation fiber laser FL2 has the lowest reflection resistance as a result of the comparison carried out in (1), a power of excitation light is reduced in the forward excitation fiber laser FL2. This allows the fiber laser FL2 to have a higher reflection resistance, so that the three fiber lasers FL1 through FL3 less vary in reflection resistance. Note, however, that the fiber laser system FLS has a lower output power in this case. In view of this, an output power of the fiber laser system FLS is maintained by increasing respective powers of the fiber laser FL1 and the fiber laser FL3. In this case, the bidirectional excitation fiber laser FL1 is configured such that an increment in power of backward excitation light exceeds an increment in power of forward excitation light (i.e., a proportion of a power of backward excitation light is increased) so that a deterioration in reflection resistance of the bidirectional excitation fiber laser FL1 is minimized. (4) In a case where the forward excitation fiber laser FL3 has the lowest reflection resistance as a result of the comparison carried out in (1), a power of excitation light is reduced in the forward excitation fiber laser FL3. This allows the fiber laser FL3 to have a higher reflection resistance, so that the three fiber lasers FL1 through FL3 less vary in reflection resistance. Note, however, that the fiber laser system FLS has a lower output power in this case. In view of this, an output power of the fiber laser system FLS is maintained by increasing respective powers of the fiber laser FL1 and the fiber laser FL2. In this case, the bidirectional excitation fiber laser FL1 is configured such that an increment in power of backward excitation light exceeds an increment in power of forward excitation light (i.e., a proportion of a power of backward excitation light is increased) so that a deterioration in reflection resistance of the bidirectional excitation fiber laser FL1 is minimized.

(Recap)

A fiber laser system (FLS) in accordance with an embodiment of the present invention includes: a fiber laser group (FL1 through FLn) including at least one bidirectional excitation fiber laser; and a control section (C) configured to increase a proportion of a backward excitation light power in the at least one bidirectional excitation fiber laser so that fiber lasers (FLi) constituting the fiber laser group (FL1 through FLn) less vary in reflection resistance.

With the configuration, in a case where fiber lasers vary in reflection resistance (particularly in a case where the at least one bidirectional excitation fiber laser has a lower reflection resistance than the other fiber lasers), it is possible to restore a reflection resistance of a fiber laser system as a whole while maintaining an output power of the fiber laser system as a whole.

The fiber laser system (FLS) in accordance with an embodiment of the present invention is preferably configured such that the control section (C) (i) calculates a ratio of (a) a Stokes light power (PSi) included in a forward output power of each of the fiber lasers (FLi) constituting the fiber laser group (FL1 through FLn) to (b) a laser light power (PLi) included in a backward output power of the each of the fiber lasers (FLi), the ratio serving as a reflection resistance index (Ri) indicating a reflection resistance of the each of the fiber lasers (FLi), and (ii) increases the proportion of the backward excitation light power in the at least one bidirectional excitation fiber laser so that the fiber lasers (FLi) constituting the fiber laser group (FL1 through FLn) less vary in reflection resistance index (Ri).

With the configuration, it is possible to restore a reflection resistance of a fiber laser system as a whole by measuring (a) a laser light power included in a backward output power of each of fiber lasers and (b) a Stokes light power included in a forward output power of each of fibers.

The fiber laser system (FLS) in accordance with an embodiment of the present invention is preferably configured such that, in a case where the at least one bidirectional excitation fiber laser has a reflection resistance index which is higher than a predetermined threshold (Th), the control section (C) increases the proportion of the backward excitation light power in the at least one bidirectional excitation fiber laser so that the at least one bidirectional excitation fiber laser has a reflection resistance index which is not more than the predetermined threshold (Th).

With the configuration, it is possible to restore a reflection resistance of a fiber laser system as a whole by simple control.

The fiber laser system (FLS) in accordance with an embodiment of the present invention is preferably configured such that, in a case where the at least one bidirectional excitation fiber laser has a reflection resistance index which is different from a representative value (median Rmid) of respective reflection resistance indices (Ri) of the fiber lasers (FLi) constituting the fiber laser group (FL1 through FLn), the control section (C) increases the proportion of the backward excitation light power in the at least one bidirectional excitation fiber laser so that the at least one bidirectional excitation fiber laser has a reflection resistance index which is closer to the representative value (median Rmid).

With the configuration, it is possible to restore a reflection resistance of a fiber laser system as a whole without unnecessarily widening a difference between a forward excitation light power and a backward excitation light power in each of fiber lasers.

A control method in accordance with an embodiment of the present invention is a method for controlling a fiber laser system (FLS) including a fiber laser group (FL1 through FLn) including at least one bidirectional excitation fiber laser, the method including the step of: increasing a proportion of a backward excitation light power in the at least one bidirectional excitation fiber laser so that fiber lasers (FLi) constituting the fiber laser group (FL1 through FLn) less vary in reflection resistance (Ri).

With the configuration, in a case where fiber lasers vary in reflection resistance (particularly in a case where the at least one bidirectional excitation fiber laser has a lower reflection resistance than the other fiber lasers), it is possible to restore a reflection resistance of a fiber laser system as a whole while maintaining an output power of the fiber laser system as a whole.

[Additional Remarks]

The present invention is not limited to the embodiments described herein, but can be altered by a skilled person in the art within the scope of the claims. That is, an embodiment derived from a proper combination of technical means appropriately modified within the scope of the claims is also encompassed in the technical scope of the present invention.

REFERENCE SIGNS LIST

FLS Fiber laser system
FL1 through FLn Fiber laser
LC Laser combiner
DF Delivery fiber
H Processing head
LD11 through LD1$m$ Forward laser diode
PC1 Forward excitation combiner
FBG1 High-reflective fiber Bragg grating
AF Amplifying optical fiber
FBG2 Low-reflective fiber Bragg grating
LD21 through LD2$m$ Backward laser diode
PC2 Backward excitation combiner
SM1 through SMn Stokes power monitor
LM1 through LMn Laser power monitor
C Control section

The invention claimed is:

1. A fiber laser system comprising:
 a fiber laser group including at least one bidirectional excitation fiber laser; and
 a control section configured to increase a proportion of a backward excitation light power in the at least one bidirectional excitation fiber laser so that fiber lasers constituting the fiber laser group less vary in reflection resistance.

2. The fiber laser system as set forth in claim 1, wherein the control section (i) calculates a ratio of (a) a Stokes light power included in a forward output power of each of the fiber lasers constituting the fiber laser group to (b) a laser light power included in a backward output power of the each of the fiber lasers, the ratio serving as a reflection resistance index indicating a reflection resistance of the each of the fiber lasers, and (ii) increases the proportion of the backward excitation light power in the at least one bidirectional excitation fiber laser so that the fiber lasers constituting the fiber laser group less vary in reflection resistance index.

3. The fiber laser system as set forth in claim 2, wherein, in a case where the at least one bidirectional excitation fiber laser has a reflection resistance index which is higher than a predetermined threshold, the control section increases the proportion of the backward excitation light power in the at least one bidirectional excitation fiber laser so that the at least one bidirectional excitation fiber laser has a reflection resistance index which is not more than the predetermined threshold.

4. The fiber laser system as set forth in claim 2, wherein, in a case where the at least one bidirectional excitation fiber laser has a reflection resistance index which is different from a median of respective reflection resistance indices of the fiber lasers constituting the fiber laser group, the control section increases the proportion of the backward excitation light power in the at least one bidirectional excitation fiber laser so that the at least one bidirectional excitation fiber laser has a reflection resistance index which is closer to the median.

5. A method for controlling a fiber laser system including a fiber laser group including at least one bidirectional excitation fiber laser, said method comprising the step of:

increasing a proportion of a backward excitation light power in the at least one bidirectional excitation fiber laser so that fiber lasers constituting the fiber laser group less vary in reflection resistance.

\* \* \* \* \*